United States Patent
Jin et al.

(10) Patent No.: US 9,660,774 B2
(45) Date of Patent: May 23, 2017

(54) DETERMINING AND MANAGING UPSTREAM PROFILES IN DOCSIS 3.1 NETWORK ENVIRONMENTS

(71) Applicant: CISCO TECHNOLOGY, INC., San Jose, CA (US)

(72) Inventors: Hang Jin, Plano, TX (US); Tong Liu, Acton, MA (US); Pawel Piotr Sowinski, Sudbury, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 130 days.

(21) Appl. No.: 14/685,422

(22) Filed: Apr. 13, 2015

(65) Prior Publication Data

US 2015/0295684 A1    Oct. 15, 2015

Related U.S. Application Data

(60) Provisional application No. 61/979,325, filed on Apr. 14, 2014.

(51) Int. Cl.
*G06F 11/00* (2006.01)
*H01J 1/16* (2006.01)
(Continued)

(52) U.S. Cl.
CPC ........... *H04L 5/0007* (2013.01); *H04B 3/542* (2013.01); *H04J 3/0667* (2013.01); *H04J 3/0673* (2013.01);
(Continued)

(58) Field of Classification Search
CPC . H04L 5/0007; H04L 12/2801; H04L 27/345; H04L 47/12; H04L 27/3405;
(Continued)

(56) References Cited

U.S. PATENT DOCUMENTS

| 7,822,107 B2 * | 10/2010 | Hsieh | H04B 1/707 375/148 |
| 2007/0242732 A1 * | 10/2007 | Hsieh | H04B 1/707 375/148 |

(Continued)

OTHER PUBLICATIONS

Data-over-cable Service Interface Specification DOCSIS 3.1, Cable Television Laboratories, Inc 2013.*

(Continued)

*Primary Examiner* — Chuong T Ho
(74) *Attorney, Agent, or Firm* — Patent Capital Group (57) ABSTRACT

An example method for determining and managing upstream profiles in Data Over Cable Service Interface Specification (DOCSIS) 3.1 network environments is provided and includes determining, at a Converged Cable Access Platform (CCAP) core, channel conditions independent of any channel effect over a hybrid fiber coaxial (HFC) network between a remote physical layer (R-PHY) entity coupled to the CCAP core and a cable modem (CM) in the DOCSIS 3.1 network environment, and assigning an upstream profile to the CM based on the channel conditions. In specific embodiments, the channel conditions include signal to noise ratio (SNR), modulation error ratio (MER) or group delay. In some embodiments, assigning the upstream profile includes determining a quadrature amplitude modulation (QAM) order based on the SNR or MER, and determining a pilot pattern based on the group delay, the combination of the QAM order and the pilot pattern identifying the upstream profile.

20 Claims, 5 Drawing Sheets

(51) Int. Cl.
*H04L 1/00* (2006.01)
*H04L 12/26* (2006.01)
*H04L 5/00* (2006.01)
*H04L 27/34* (2006.01)
*H04B 3/54* (2006.01)
*H04L 27/26* (2006.01)
*H04L 12/801* (2013.01)
*H04L 12/807* (2013.01)
*H04J 3/06* (2006.01)
*H04L 12/28* (2006.01)

(52) U.S. Cl.
CPC .......... *H04L 5/006* (2013.01); *H04L 12/2801* (2013.01); *H04L 27/2697* (2013.01); *H04L 27/3405* (2013.01); *H04L 27/345* (2013.01); *H04L 47/12* (2013.01); *H04L 47/27* (2013.01)

(58) Field of Classification Search
CPC ..... H04L 27/2697; H04L 5/006; H04L 47/27; H04J 3/0667; H04J 3/0673; H04B 3/542
USPC .......................................... 370/252, 254, 390
See application file for complete search history.

(56) References Cited

U.S. PATENT DOCUMENTS

| | | | |
|---|---|---|---|
| 2009/0285233 A1* | 11/2009 | Al-Banna | H04L 12/2881 370/419 |
| 2013/0070765 A1* | 3/2013 | Chapman | H04L 12/2801 370/390 |
| 2015/0222449 A1* | 8/2015 | Salinger | H04L 12/2801 370/419 |
| 2015/0295669 A1 | 10/2015 | Chapman et al. | |
| 2015/0295746 A1 | 10/2015 | Chapman et al. | |
| 2015/0295838 A1 | 10/2015 | Liu et al. | |

OTHER PUBLICATIONS

U.S. Appl. No. 61/934,419, filed Jan. 31, 2014.*
Chapman, John T., "The Power of DOCSIS 3.1 Downstream Profiles," NCTA Technical Paper, 2013 Spring Technical Forum, Jun. 10-12, 2013, Washington, DC; 16 pages. http://www.nctatechnicalpapers.com/Paper/2013.

* cited by examiner

| CONSTELLATION | SNR (dB) |
|---|---|
| QPSK | 11.0 |
| 8-QAM | 14.0 |
| 16-QAM | 17.0 |
| 32-QAM | 20.0 |
| 64-QAM | 23.0 |
| 128-QAM | 26.0 |
| 256-QAM | 29.0 |
| 515-QAM | 32.5 |
| 1024-QAM | 35.5 |
| 2048-QAM | 39.0 |
| 4096-QAM | 43.0 |

| GROUP DELAY | PILOT PATTERN (50KHz SC) | PILOT PATTERN (25KHz SC) |
|---|---|---|
| g_t<10*t0 | PATTERN 1 | PATTERN 5 |
| 10*t0<=g_t<20*t0 | PATTERN 2 | PATTERN 6 |
| 20*t0<=g_t<50*t0 | PATTERN 3 | PATTERN 7 |
| 50*t0<=g_t | PATTERN 4 | PATTERN 8 |

DETERMINING AND MANAGING UPSTREAM PROFILES IN DOCSIS 3.1 NETWORK ENVIRONMENTS

CROSS-REFERENCE TO RELATED APPLICATION

This application claims the benefit of priority under 35 U.S.C. §119(e) to U.S. Provisional Application Ser. No. 61/979,325 entitled "REMOTE PHY ARCHITECTURE," filed Apr. 14, 2014, which is hereby incorporated by reference in its entirety.

TECHNICAL FIELD

This disclosure relates in general to the field of communications and, more particularly, to determining and managing upstream profiles in Data Over Cable Service Interface Specification (DOCSIS) 3.1 network environments.

BACKGROUND

Driven by market evolution towards triple-play services, cable operators in emerging markets are seeking standardized and digital fiber-based solutions for economical and future proof access technologies. Much of the demand is driven by the need to provide higher bandwidth packet transport for Internet connectivity, video and voice services. DOCSIS is an international telecommunications standard that has evolved to permit addition of high-bandwidth data transfer to an existing cable TV (CATV) system utilizing Quadrature Amplitude Modulation (QAM) and/or Quadrature phase-shift keying (QPSK) Radio Frequency (RF) modulation. It is employed by many cable television operators to provide Internet access over their existing hybrid fiber-coaxial (HFC) infrastructure. Traditionally, the DOCSIS system is a Point-to-Multipoint communications system, the corresponding standards defining Media Access Control (MAC)/physical layer (PHY) standards associated with providing high speed data over a hybrid fiber coaxial (HFC) network and is not naturally applicable for digital fiber. However, Cisco® remote-PHY (R-PHY) technology bridges the gap, leveraging existing Internet Protocol (IP) technologies to deploy data over digital fiber, enabling two-way services over cable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for determining and managing upstream profiles in Data Over Cable Service Interface Specification (DOCSIS) 3.1 network environments is provided and includes determining, at a Converged Cable Access Platform (CCAP) core, channel conditions independent of any channel effect over a hybrid fiber coaxial (HFC) network between a remote physical layer (R-PHY) entity coupled to the CCAP core and a cable modem (CM) in the DOCSIS 3.1 network environment, and assigning an upstream profile to the CM based on the channel conditions. In specific embodiments, the channel conditions include signal to noise ratio (SNR), modulation error ratio (MER) or group delay. In some embodiments, assigning the upstream profile includes determining a quadrature amplitude modulation (QAM) order based on the SNR or MER, and determining a pilot pattern based on the group delay, the combination of the QAM order and the pilot pattern identifying the upstream profile.

As used herein, the term "profile" specifies modulation order and pilot patterns for active data sub-carriers of an Orthogonal Frequency-Division Multiplex Access (OFDMA) channel; in other words, a combination of a particular modulation order and pilot pattern indicates a unique profile. Further, an upstream direction indicates a communication path from CMs to the CCAP core; a downstream direction indicates a communication path from the CCAP core to the CMs. Note that MER is digital complex baseband SNR and the terms "SNR" and "MER" are used interchangeably herein, unless specifically differentiated.

Example Embodiments

Figure 1:
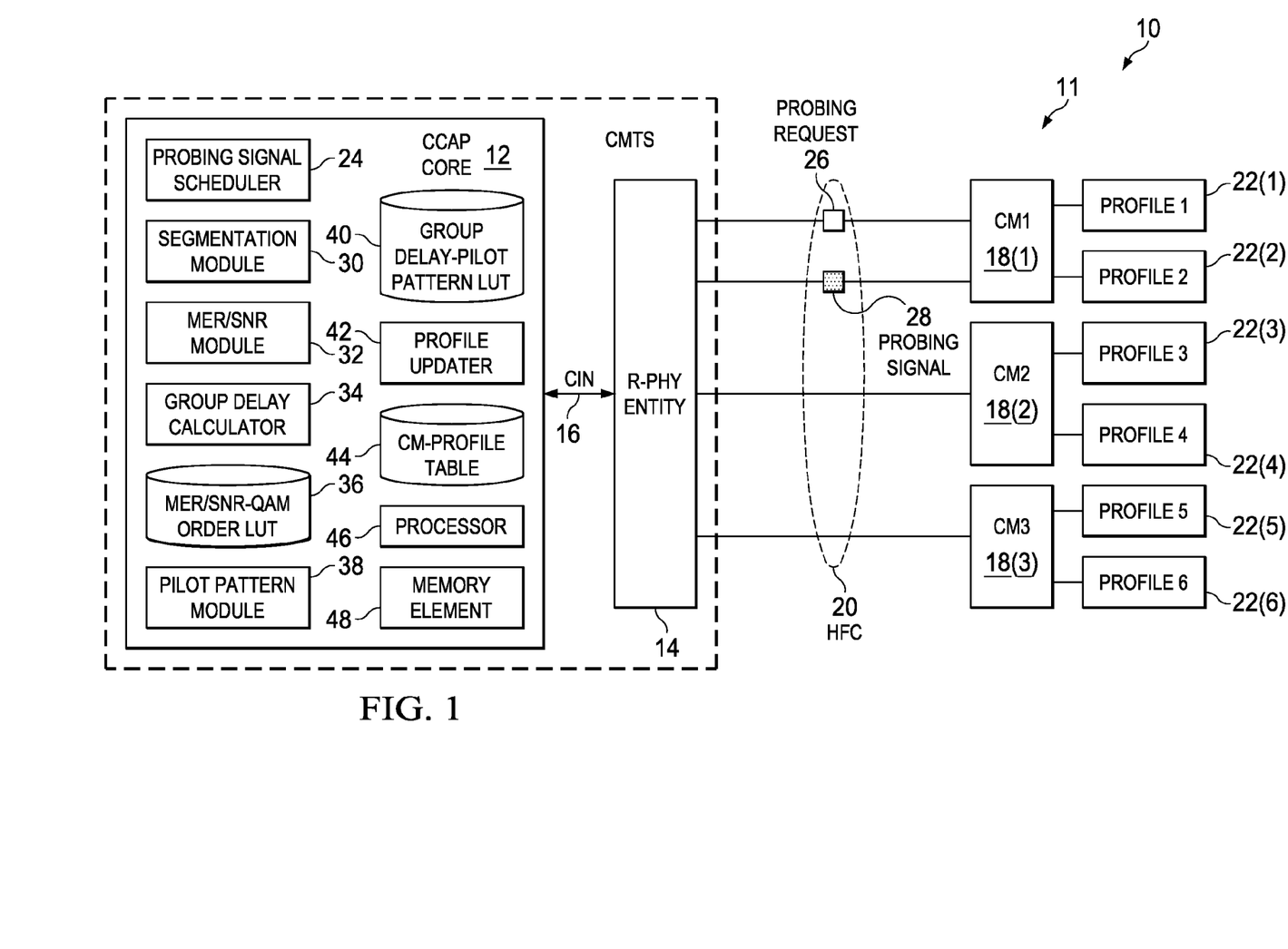
FIG. 1 is a simplified block diagram illustrating a communication system for determining and managing upstream profiles in DOCSIS 3.1 network environments.

Turning to FIG. 1, FIG. 1 is a simplified block diagram illustrating a communication system 10 for determining and managing upstream profiles in DOCSIS 3.1 network environments in accordance with one example embodiment. FIG. 1 illustrates a network 11 (indicated generally by an arrow) facilitating communication between a Converged Cable Access Platform (CCAP) core 12 and an R-PHY entity 14 over a converged interconnect network (CIN) 16, and between R-PHY entity 14 and multiple cable modems (CMs) 18(1)-18(3) over a hybrid fiber coaxial (HFC) network 20. Note that network 11 can include any number of CCAP cores, each connected to a plurality of R-PHY entities, each of which is connected to multiple CMs within the broad scope of the embodiments. CCAP core 12 and R-PHY entity 14 together comprise a CCAP, which is typically a combination of a DOCSIS cable modem termination system (CMTS) and an edge QAM (EQAM). CCAP core 12 and R-PHY entity 14 can communicate remotely in some embodiments over CIN 16 that can span across different geographic locations; in other embodiments, CIN 16 may comprise a set of interfaces within the same chassis.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

DOCSIS 3.1 specifies OFDMA for upstream channelization. Orthogonal frequency division multiplexing (OFDM) is a method of multi-carrier digital communication where wide-band information data is distributed across many narrow-band subcarriers in the frequency domain. OFDMA is a method of multi-user digital communications, wherein each user utilizes an allotment of the available sub-carriers and time intervals for their individual communication. Because the fundamental operation and advantages of OFDMA systems is similar to that of OFDM systems in a multipath wireless propagation environment, the terms OFDM and OFDMA are used here interchangeably.

OFDM divides the upstream spectrum into multiple equally spaced subcarriers. In DOCSIS, the subcarrier spacing is 25 kHz or 50 kHz, corresponding to 40 us or 20 us long symbol duration, respectively. The subcarriers are divided into multiple equally sized clusters called mini-slots. Each mini-slot consists of Q subcarriers, where Q equals to 16 or 8 corresponding to 25 kHz or 50 kHz subcarrier spacing, respectively. A QAM order and a pilot pattern (e.g., reference signal with information known apriori to the receiver; pilot patterns have known, fixed characteristics when they are transmitted) are assigned to each mini-slot. (In contrast to single carrier systems (such as SC-QAM), coherent orthogonal frequency-division multiplexing (OFDM) systems traditionally have pilot patterns placed at specified intervals in time and frequency, in the OFDM frequency-time signal space, to facilitate simple channel estimation for a range of frequencies and channel dispersion.) The QAM order and pilot pattern can change from one mini-slot to another. DOCSIS 3.1 supports up to eleven (11) levels of QAM orders (Quadrature Phase Shift Keying (QPSK)-4KQAM, squared and non-squared (the notation KQAM is used to indicate a modulation scheme encoding $\log_2(K)$ bits per symbol, thereby providing K symbols)) and 8 different pilot patterns.

DOCSIS 3.1 specifications allow for profiles 22 to be assigned to each CM 18 allowing upstream resource allocations and dictating how upstream symbols are demodulated at CCAP core 12. For example, profiles 22(1) and 22(2) are assigned to CM 18(1); profiles 22(3) and 22(4) are assigned to CM 18(2); profiles 22(5) and 22(6) are assigned to CM 18(3); and so on. In a general sense, each of profiles 22 specifies the QAM order for data symbols and pilot pattern of a mini-slot of an upstream OFDMA channel. Each OFDM channel has its own unique set of profiles 22 (e.g., profiles 22 describe subcarriers at a particular frequency, and each OFDM channel occupies different frequencies.) From a packet forwarding perspective, each profile 22 creates a unique path through an OFDM channel from R-PHY entity 14 to CMs 18. The term 'profile' can be considered a PHY level description for the packet forwarding mechanism; the term 'path' can be considered a MAC level description for the packet forwarding mechanism.

Profiles 22 can allow for effective optimization of the transmission path to or from CMs 18 that can tolerate a higher modulation. The aggregate capacity of the OFDM channel depends upon the configuration of each of profiles 22 characterizing the OFDM channel and the relative usage of each profile 22 because all profiles 22 (for each OFDM channel) in combination share the aggregate channel capacity (for each OFDM channel). Each profile 22 profile can be characterized (e.g., indicated, defined, specified, parameterized, etc.) by the QAM orders and pilot patterns on the mini-slots over the spectrum. According to DOCSIS 3.1, each CM 18 should support up to two profiles 22 for upstream data traffic. In the upstream, profile 22 can be synonymous with data Interval Usage Codes (IUCs); their allocations are signaled by MAP messages.

CCAP core 12 determines the allocation of profiles 22 to each OFDM channel, and to each CM 18. The profile management involves two distinct tasks: (1) determine the OFDM profile parameters (e.g., QAM order and pilot pattern); (2) assign profiles 22 to groups of CMs 18 from whom CCAP core 12 receives upstream signals with similar fidelity, for example, based on the quality of their respective communication links with R-PHY entity 14 over HFC network 20.

Assume, merely as an example, and not as a limitation that CCAP core 12 attempts to make a profile assignment to CM 18(1). According to DOCSIS 3.1 specifications, CM 18(1) is eligible to be assigned two profiles, and CCAP core 12 determines the QAM orders and pilot patterns that characterize two profiles 22(1) and 22(2), for example, based on the bandwidth availability and other communication link conditions between R-PHY entity 14 and CM 18(1). To determine the QAM order and pilot pattern for each mini-slot, a probing signal scheduler 24 in CCAP core 12 may schedule a wide band probing signal and allocate two probing opportunities within the same probe frame in a probing request 26 for CM 18(1), which may be forwarded to CM 18(1) over HFC network 20. CM 18(1) may respond with a probing signal 28.

A segmentation module 30 in CCAP core 12 divides the spectrum of probing signal 28 (also referred to herein as the channel response) into multiple segments. A modulation error ratio (MER)/signal to noise ratio (SNR) module 32 determines a 'true' MER/SNR of probing signal 28 that is independent of the effect of the OFDM channel (e.g., each channel may affect SNR/MER differently, for example, through group delay variation, amplitude tilt or ripple, and micro-reflections) for each segment. Note that MER refers to a ratio of average symbol power to average error power (e.g., the higher the MER, the cleaner (less distorted) the received signal).

In some embodiments, the segmentation is evaluated and adjusted substantially continuously with each probing opportunity. In some embodiments, the segmentation is evaluated by examining how quickly the QAM order and pilot pattern vary from one segment to another, and re-adjusted with each probing opportunity if necessary. Each segment includes multiple mini-slots that have the same QAM order and pilot pattern. In some embodiments, the segments are not equal in size. In other embodiments, the segments may be substantially equal in size.

In a general sense, the QAM order can be determined by the inherent spectrum efficiency or channel capacity of the mini-slot, which may be determined from signal MER/SNR measurements at the input of a low-density parity-check (LDPC) decoder in MER/SNR module 32 after channel estimation. A group delay calculator 34 may compute the average group delay of each segment, which is correlated with the channel variation. "Group delay" refers to a negative derivative of phase with respect to frequency, expressed mathematically as $g\_t = -(d\phi/d\omega)$ and expressed in units of time such as nanoseconds. Group delay variation refers to a difference in propagation time between one frequency and another (e.g., some frequency components of the signal may arrive at the output before others, causing distortion of the received signal).

In some embodiments, the group delay is estimated through a phase ramp in frequency domain, which can be an effective scheme with low complexity. Group delay calculator 34 may determine the QAM order for each segment by mapping the computed MER/SNR to QAM order using a MER/SNR-QAM order Look-Up-Table (LUT) 36. In various embodiments, MER/SNR-QAM order LUT 36 may be preconfigured in CCAP core 12 using simulations, calibrations, heuristic techniques, or other mechanisms.

A pilot pattern module 38 in CCAP core 12 may determine how quickly the channel gain varies within the mini-slot (8 or 16 subcarriers, total 400 kHz BW), for example, to select a pilot pattern with proper pilot density. Pilot pattern module 38 may determine the profile granularity over the spectrum (e.g., by grouping multiple adjacent mini-slots together and assign the same QAM order and pilot pattern to reduce computations and upstream channel allocation complexity). In some embodiments, pilot pattern module 38 may determine the pilot pattern for each segment by mapping the computed group delay to pilot patterns using a group delay-pilot pattern LUT 40. In various embodiments, group delay-pilot pattern LUT 40 may be preconfigured in CCAP core 12 using simulations, calibrations, heuristic techniques, or other mechanisms. Pilot pattern module 38 may generate multiple profiles from a base profile by adding margins. A profile updater 42 in CCAP core 12 may also update profiles 22 to cope with varying channels and cable modem conditions. Assigned profiles 22(1) and 22(2) may be mapped to CM 18(1) in a CM-profile table 44. A processor 46 and a memory element 48 may facilitate the operations described herein.

In various embodiments, segmentation can simplify CMTS algorithms to evaluate upstream probing signal 28, for example, by not requiring processor intensive per sub-carrier computations. The operations described herein can allow dynamically adjusting a size of profiles 22, and reducing computation and complexity of upstream schedulers. In some embodiments, various modules may be implemented (e.g., execute on) hardware accelerators using appropriate hardware configured with suitable software.

Turning to the infrastructure of communication system 10, the network topology can include any number of cable modems, customer premises equipment, servers, switches (including distributed virtual switches), routers, and other nodes inter-connected to form a large and complex network. Network 11 represents a series of points or nodes of inter-connected communication paths for receiving and transmitting packets and/or frames of information that are delivered to communication system 10. A node may be any electronic device, computer, printer, hard disk drive, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Network 11 offers a communicative interface between cable modem network components, and may include any local area network (LAN), wireless local area network (WLAN), metropolitan area network (MAN), Intranet, Internet, Extranet, wide area network (WAN), virtual private network (VPN), or any other appropriate architecture or system that facilitates communications in a network environment. Network 11 may implement any suitable communication protocol for transmitting and receiving data packets within communication system 10. The architecture of the present disclosure may include a configuration capable of TCP/IP, TDMA, and/or other communications for the electronic transmission or reception information in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In particular embodiments, CCAP core 12 may comprise a hardware appliance with appropriate ports, processors, memory elements, interfaces, and other electrical and electronic components that facilitate the functions described herein. In some embodiments, the various modules in CCAP core 12 may comprise hardware devices or software applications or combination thereof executing within CCAP core 12 to perform the operations described herein. In other embodiments, the various modules in CCAP core 12 may comprise hardware devices or software applications executing outside CCAP core 12, for example, in a separate appliance, server, or other network element and coupled (e.g., connected to, in communication with, etc.) to CCAP core 12 in network 11.

R-PHY entity 14 may comprise suitable hardware components and interfaces for facilitating the operations described herein. In some embodiments, R-PHY entity 14 may be embedded in or be part of another hardware component, such as a broadband processing engine (comprising a motherboard, microprocessors and other hardware components). In some embodiments, R-PHY entity 14 comprises downstream and upstream PHY, deployed in a Coaxial Media Converter (CMC) that supports RF functions at the PHY layer.

Note that is some embodiments, CCAP core 12 and R-PHY entity 14 may be located in the same chassis; in other embodiments, CCAP core 12 and R-PHY entity 14 may be located in different physical locations, remote from each other and coupled over a Layer 2 or Layer 3 network with various other network elements, such as switches and routers intervening there between.

Figure 2:
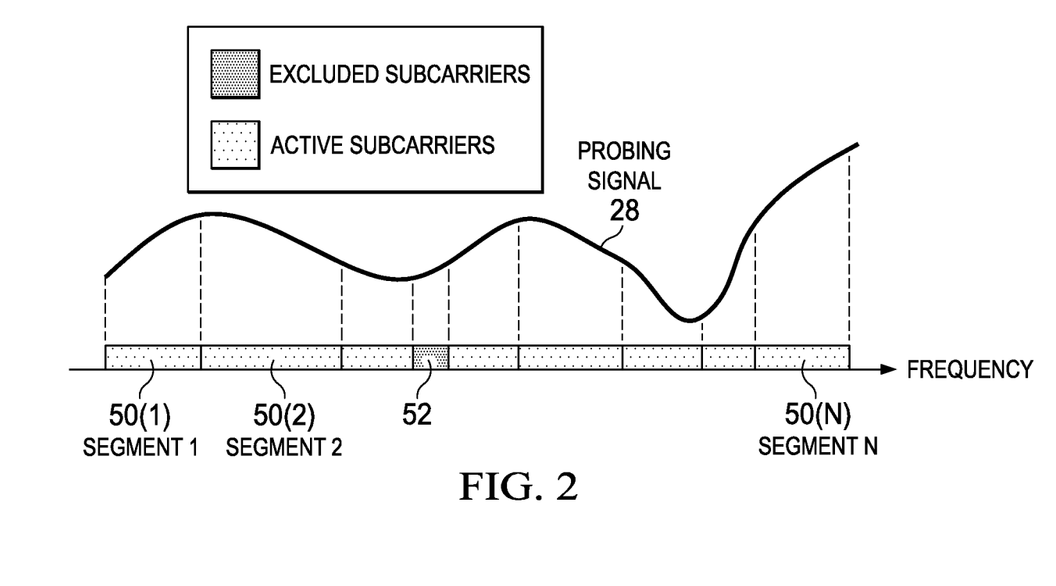
FIG. 2 is a simplified block diagram illustrating example details of embodiments of the communication system.

Turning to FIG. 2, FIG. 2 is a simplified block diagram illustrating example details associated with segmentation according to an embodiment of communication system 10. The frequency spectrum of probing signal 28 may be segmented in N segments 50(1)-50(N). In some embodiments, segmentation is performed at mini-slot boundaries. The spectrum may be segmented to account for upstream channel variation. For example, portions of the spectrum with large channel variations may be segmented into small size segments (e.g., fine segmentation); portions of the spectrum with small channel variations may be segmented into large size segments (e.g., coarse segmentation). In some embodiments, channel variation is estimated from probing signal 28 detected in a current probing opportunity; in other embodiments, channel variation may be estimated from probing signal 28 in current and previous probing opportunities. Segmentation may be continuously evaluated and adjusted based on the latest channel information.

In various embodiments, the spectrum may be segmented such that the SNR and channel response remain relatively constant within each segment. The SNR and group delay may be computed for each segment separately. Variations of the SNR and group delay between segments may also be determined. If the variation is greater than a preconfigured threshold (e.g., 30%), size of the segments where rapid changes occur may be reduced correspondingly (e.g., by splitting one segment into two). If the variation is less than another preconfigured threshold (e.g., 5%) the segment size may be increased by combining adjacent segments. The segmentation may be re-evaluated and adjusted substantially continuously with each probing opportunity.

Note that segmentation is applicable to active subcarriers, and not to 'excluded subcarriers' 52. In a general sense, excluded subcarriers are forced to zero-valued modulation at the transmitter. Subcarriers are excluded to prevent interference to other transmissions that occupy the same spectrum, for example, to accommodate legacy channels. Subcarriers are also excluded outside of the active OFDM bandwidth. Excluded subcarriers are common to all profiles 22. The non-excluded subcarriers are referred to as active subcarriers.

Figure 3:
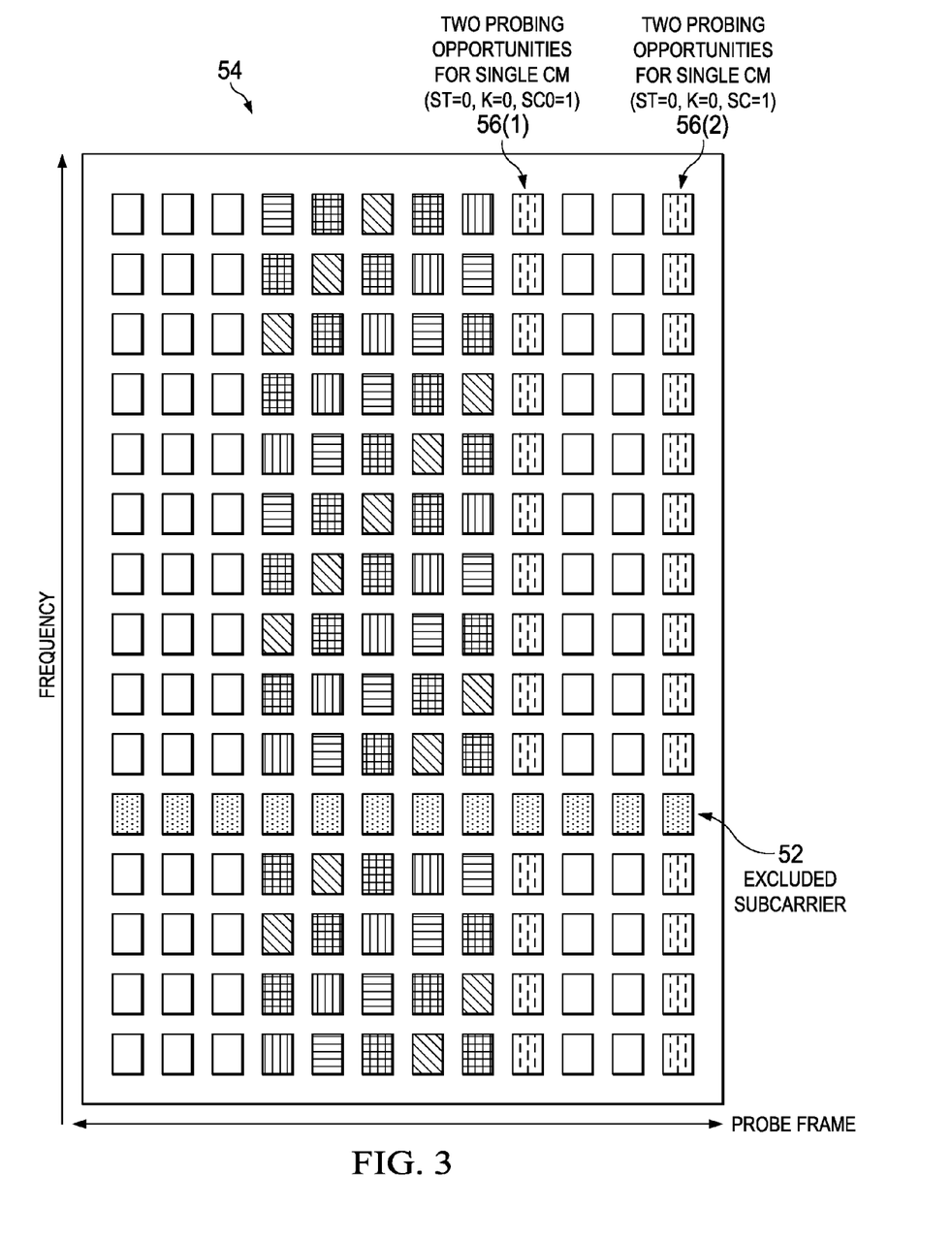
FIG. 3 is a simplified block diagram illustrating other example details of embodiments of the communication system.

Turning to FIG. 3, FIG. 3 is a simplified block diagram illustrating example details of a probe frame 54 according to an embodiment of communication system 10. Frequency is graphed along a vertical axis, and time (or symbols) is graphed along a horizontal axis. For the purpose of determining upstream profile 22, probing signal scheduler 24 schedules two probing opportunities 56(1) and 56(2) in a single probe frame 54. In an example embodiment, probing opportunities 56(1) and 56(2) are configured with no-stagger, no skip, and starting index=0.

In various embodiments, probing signal 28 may comprise a pseudo-random binary sequence (PRBS) modulated with binary phase-shift keying (BPSK). Probing signal 28 may be by de-randomized by removing the known PRBS sequence from probing signal 28. The channel effect may be removed to compute the 'true' SNR/MER. The de-randomized probing signals for a first opportunity and a second opportunity ($P1(i)$ and $P2(i)$ respectively) for the $i^{th}$ active subcarrier may be obtained by multiplying probing signal 28 with the known probing PRBS as follows:

$$P1(i)=S1(i)*PRBS(i);$$

$$P2(i)=S2(i)*PRBS(i);$$

$$i=1,2,\ldots$$

where $S1(i)$, $S2(i)$ are, respectively, probing signal 28 at the first opportunity and the second opportunity; $PRBS(i)$ is the known PRBS; and index i runs over active subcarriers in the segment. The channel estimation independent of the channel effect may be computed as:

$$P12(i) = \frac{P1(i)}{P2(i)}$$

The leveraged de-randomized probing signal $P12(i)$ (i=1, 2, . . . ) contains no channel effects.

After the channel estimation, the SNR/MER can be computed from the following equation:

$$SNR = \frac{Ns}{\Sigma_i \mathrm{abs}(P12(i) - 1)^2}$$

Where Ns is the total number of active subcarriers in the segment. The formula utilizes the fact that probing signal is modulated with BPSK (e.g., reference point on a QAM constellation is 1; in a general sense, a constellation represents the possible symbols (e.g., waveform such as a pulse or tone representing a certain number of bits) that may be selected by a given modulation scheme). The SNR computed as described herein may include no channel effect, and may be a true representative for the MER/SNR at the input of LDPC decoder. Thereafter, the QAM order for the segment can be obtained through MER/SNR-QAM order LUT 36.

Figure 4:
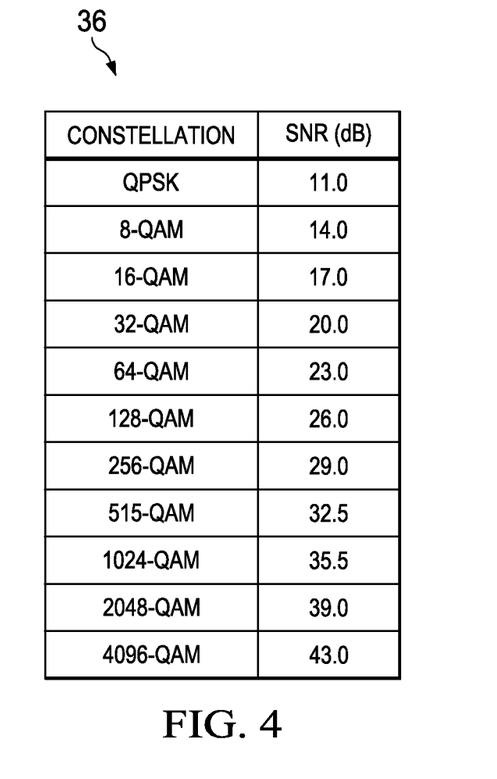
FIG. 4 is a simplified block diagram illustrating yet other example details of embodiments of the communication system.

Turning to FIG. 4, FIG. 4 is a simplified diagram illustrating an example MER/SNR-QAM order LUT 36 according to an embodiment of communication system 10. MER/SNR-QAM order LUT 36 may be generated from simulations, testing, calibration, heuristics, or other suitable mechanisms within the broad scope of the embodiments. MER/SNR-QAM order LUT 36 represents an association between the QAM constellation (indicative of the QAM order) and SNR (or MER). If the SNR/MER is known, a lookup of MER/SNR-QAM order LUT 36 can indicate the corresponding QAM order to be used for profile 22.

Figure 5:
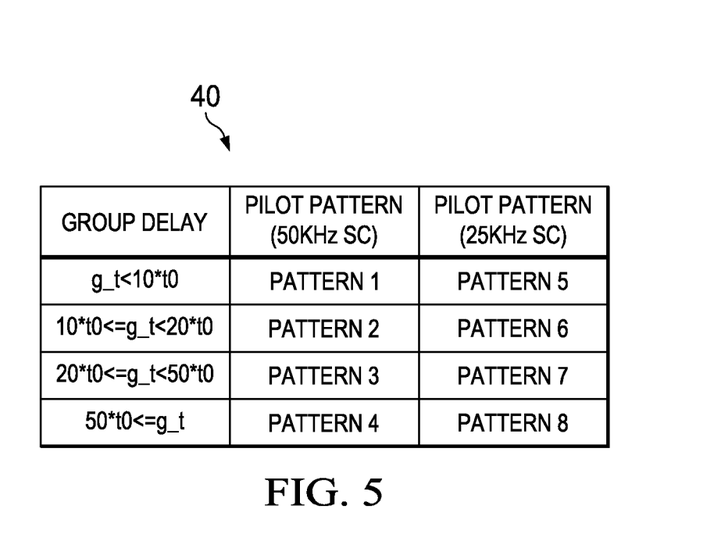
FIG. 5 is a simplified block diagram illustrating yet other example details of embodiments of the communication system.

Turning to FIG. 5, FIG. 5 is a simplified diagram illustrating an example group delay-pilot pattern LUT 40 according to an embodiment of communication system 10. Group delay may be associated with a pilot pattern in group delay-pilot pattern LUT 40 based on simulations, testing, calibration, heuristics, or other suitable mechanisms within the broad scope of the embodiments. The group delay (e.g., time offset) can be a good indication of channel variation, which in turn can determine a suitable pilot pattern density (e.g., number of pilot patterns in a signal of known duration). In various embodiments, the group delay is estimated from a phase ramp in each segment. For example, in each segment, a dot product of the conjugate of probing signal 28 on the $i^{th}$ subcarrier with probing signal 28 on the next $((i+1)^{th})$ subcarrier may be obtained:

$$bi=\mathrm{conj}(P''(i))\cdot P'(i+1); i=1,2\ldots$$

where P(i) and P(i+1) are, respectively, probing signal 28 detected on $i^{th}$ and $(i+1)^{th}$ subcarriers in the segment being evaluated. The result bi may be summed over the subcarriers in the segment:

$$c = \sum_i bi;$$

The group delay g_t may be computed as follows:

$$g\_t = abs\left(\frac{angle\left(\frac{c}{2\pi}\right)}{sc}\right)$$

where sc is a subcarrier space (e.g., 25 kHz or 50 kHz).

Based on the group delay g_t, the pilot pattern for the segment can be obtained according to group delay-pilot pattern LUT 40. For example, if g_t is computed to be less than 10 times a preconfigured threshold value t0, a predetermined pattern 1 may be used in the 50 kHz subcarrier space, whereas pattern 5 may be used in the 25 kHz subcarrier space. If g_t is between 10 times t0 and 20 times t0, pattern 2 may be used in the 50 kHz subcarrier space, whereas pattern 6 may be used in the 25 kHz subcarrier space. Note that the thresholds (e.g., t0, 10*t0, 20*t0, etc.) can be changed to suit particular needs within the broad scope of the embodiments.

In various embodiments, CMs 18 can support up to two upstream profiles for data traffic (and additional profiles for downstream traffic). In some embodiments, additional profiles can be generated from a base profile (e.g., determined as described herein) by adding margins. For example, assume that profile 22(1) is designated for short and high priority messages, 3 dB margin can be added to obtain another QAM order from MER/SNR-QAM order LUT 36 and an additional level can be added to the group delay to obtain another pilot pattern from group delay—pilot pattern LUT 40 to generate another profile 22(2).

Typically, profile information to CMs 18 is carried through an Interval Usage Code (IUC) in a downstream message from the CMTS to CMs 18. In a general sense, tells IUCs indicate to each cable modem the type of modulation (and other characteristics) to use depending upon the information the cable modems are transmitting to the CMTS. In DOCSIS 3.1, the profiles can be identified by any one of IUCs 5, 6, 9, 10, 11, 12, 13 in a downstream message. In various embodiments, prior to CM registration, IUC 13 may be used to inform CMs 18 of assigned profiles 22 and for carrying upstream traffic. Generally IUC 13 has robust settings that allow data transmission on all the segments. Profile measurement and selection on the data profiles configured on a channel is performed according to various mechanisms. For example, during or after CM 18(1) registration, the CMTS has the option of assigning CM 18(1) one or two data profiles 22(1) and 22(2) that have higher bandwidth capacity than IUC 13, based on the service agreement associated with CM 18(1)'s service flows. After the registration, the CMTS may adjust profile settings to better fit RF plant and/or modem conditions which may vary over time. The mechanisms described herein according to various embodiments can be used to measure and evaluate profile performance before assigning the profiles to CMs 18, and/or to adjust profiles 22 in use.

Figure 6:
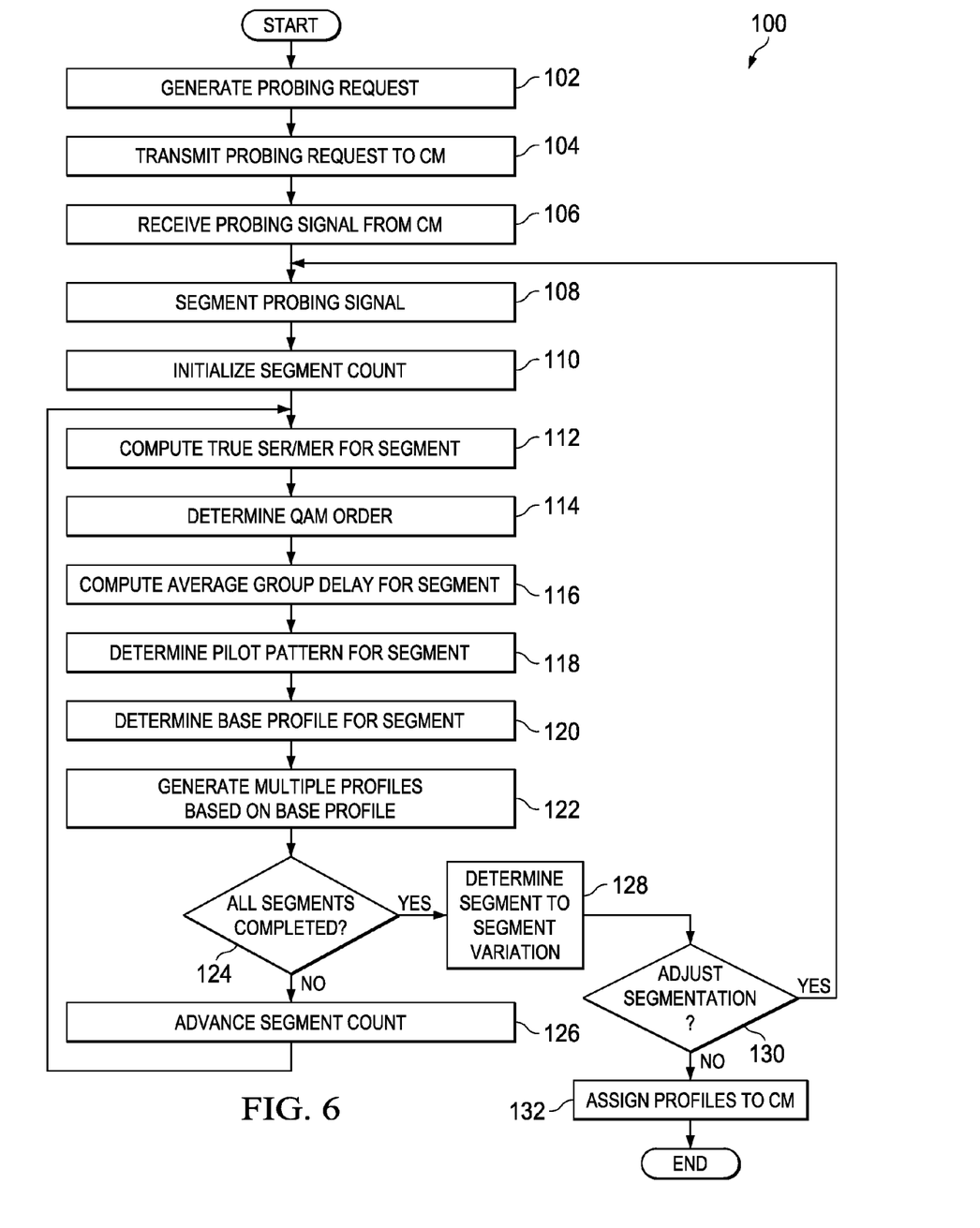
FIG. 6 is a simplified flow diagram illustrating example operations that may be associated with an embodiment of the communication system.

Turning to FIG. 6, FIG. 6 is a simplified flow diagram illustrating example operations 100 that may be associated with embodiments of communication system 10. Note that operations 100 are described in association with CM 18(1); however, the operations may be applicable to any one or more CMs 18 in communication system 10. At 102, probing signal scheduler 24 at CCAP core 12 may generate probing request 26. At 104, CCAP core 12 and R-PHY entity 14 may transmit probing request 26 to CM 18(1). At 104, CCAP core 12 may receive probing signal 28 from CM 18(1). At 108, segmentation module 30 at CCAP core 12 may segment probing signal 28 according to various channel response characteristics. For example, portions of probing signal 28 with high channel variations may be segmented finely into small segments; portions of probing signal 28 with low channel variations may be segmented coarsely into large segments.

At 110, the segment count may be initialized (e.g., segment count set to 1; a first segment selected; etc.) At 112, MER/SNR module 32 at CCAP core 12 may compute the true SER/MER for the selected segment discounting channel effects. At 114, the QAM order corresponding to the computed SER/MER may be determined from MER/SNR-QAM order LUT 36. At 116, group delay calculator 34 may compute the group delay for the segment. At 120, a base pilot pattern corresponding to the computed group delay may be determined from group delay-pilot pattern LUT 40. At 122, multiple profiles may be generated based on the base profile, for example, by adding margins. At 124, a determination may be made whether computation for substantially all segments are completed. If not, the operations step to 126, at which the segment count is advanced (e.g., incremented; next segment selected; etc.) If computations for substantially all segments have been completed, at 128, segment to segment variation of QAM order and pilot pattern may be determined.

At 130, a determination may be made whether to adjust the segmentation. If segments are to be adjusted, the operations may step back to 108, and continue thereafter. For example, if the segment to segment variation in SNR and group delay is larger than a preconfigured threshold, the segment sizes in the affected segments may be halved. If the segment to segment variation in SNR and group delay is smaller than a preconfigured threshold, the segment sizes in the affected segments may be doubled; and so on. The operations may continue until segmentation adjustment is not needed further. Thereafter, at 132, profiles (as determined from the QAM order and pilot patterns) may be assigned to CM 18(1).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, R-PHY entity 14 and/or CCAP core 12. In some embodiments, one or more of these features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, R-PHY entity 14 and/or CCAP core 12 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 48) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 46) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    determining, at a Converged Cable Access Platform (CCAP) core, channel conditions independent of any channel effect over a hybrid fiber coaxial (HFC) network between a remote physical layer (R-PHY) entity coupled to the CCAP core and a cable modem (CM) in a Data Over Cable Service Interface Specification (DOCSIS) 3.1 network environment; and
    assigning an upstream profile to the CM based on the channel conditions including group delay and at least one of signal to noise ratio (SNR) and modulation error ratio (MER), wherein assigning the upstream profile comprises:
    determining a quadrature amplitude modulation (QAM) order based on at least one of SNR and MER; and
    determining a pilot pattern based on the group delay, wherein a combination of the QAM order and the pilot pattern identifies the upstream profile.

2. The method of claim 1, wherein the QAM order is determined from a lookup table (LUT) associating a QAM constellation indicative of the QAM order with SNR.

3. The method of claim 1, wherein the pilot pattern is determined from a LUT associating the group delay with the pilot pattern.

4. The method of claim 1, wherein the group delay is estimated through phase ramp in frequency domain.

5. The method of claim 1, further comprising sending a probing request to the CM for a probing signal comprising at least two probing opportunities, wherein the CM responds with the probing signal, wherein the channel conditions are determined from the probing signal.

6. The method of claim 5, wherein the determining the channel conditions independent of any channel effect comprises:
    segmenting the probing signal according to channel variations;
    for each segment, de-randomizing the probing signal for the at least two probing opportunities; and
    for each segment, comparing the de-randomized probing signal for the at least two probing opportunities to remove any channel effects.

7. The method of claim 6, wherein the probing signal is segmented such that the SNR and channel variations remain relatively constant within each segment.

8. The method of claim 6, wherein if the SNR and group delay variation between any two segments is greater than a preconfigured threshold, the segmenting is repeated with smaller sized segments, wherein if the SNR and group delay variation between any two segments is less than another preconfigured threshold, the segment is repeated with larger sized segments.

9. Non-transitory tangible computer readable media that includes instructions for execution, which when executed by a processor, performs operations comprising:
    determining, at a CCAP core, channel conditions independent of any channel effect over a HFC network between a R-PHY entity coupled to the CCAP core and a CM in a DOCSIS 3.1 network environment; and
    assigning an upstream profile to the CM based on the channel conditions including group delay and at least one of SNR and MER, wherein assigning the upstream profile comprises:
    determining a QAM order based on at least one of SNR and MER; and
    determining a pilot pattern based on the group delay, wherein a combination of the QAM order and the pilot pattern identifies the upstream profile.

10. The media of claim 9, wherein the operations further comprise sending a probing request to the CM for a probing signal comprising at least two probing opportunities, wherein the CM responds with the probing signal, wherein the channel conditions are determined from the probing signal.

11. The media of claim 10, wherein the determining the channel conditions independent of any channel effect comprises:
    segmenting the probing signal according to channel variations;
    for each segment, de-randomizing the probing signal for the at least two probing opportunities; and
    for each segment, comparing the de-randomized probing signal for the at least two probing opportunities to remove any channel effects.

12. The media of claim 11, wherein if the SNR and group delay variation between any two segments is greater than a preconfigured threshold, the segmenting is repeated with smaller sized segments, wherein if the SNR and group delay variation between any two segments is less than another preconfigured threshold, the segment is repeated with larger sized segments.

13. The media of claim 9, wherein the pilot pattern is determined from a LUT associating the group delay with the pilot pattern.

14. The media of claim 9, wherein the group delay is estimated through phase ramp in frequency domain.

15. An apparatus, comprising:
    a CCAP core;
    a memory element for storing data; and
    a processor, wherein the processor executes instructions associated with the data, wherein the processor and the memory element cooperate, such that the apparatus is configured for:
        determining, at the CCAP core, channel conditions independent of any channel effect over a HFC network between a R-PHY entity coupled to the CCAP core and a CM in a DOCSIS 3.1 network environment; and
        assigning an upstream profile to the CM based on the channel conditions including group delay and at least one of SNR and MER, wherein assigning the upstream profile comprises:
    determining a QAM order based on at least one of SNR and MER; and
    determining a pilot pattern based on the group delay, wherein a combination of the QAM order and the pilot pattern identifies the upstream profile.

16. The apparatus of claim 15, further configured for sending a probing request to the CM for a probing signal comprising at least two probing opportunities, wherein the CM responds with the probing signal, wherein the channel conditions are determined from the probing signal.

17. The apparatus of claim 16, wherein the determining the channel conditions independent of any channel effect comprises:
    segmenting the probing signal according to channel variations;
    for each segment, de-randomizing the probing signal for the at least two probing opportunities; and
    for each segment, comparing the de-randomized probing signal for the at least two probing opportunities to remove any channel effects.

18. The apparatus of claim 17, wherein if the SNR and group delay variation between any two segments is greater than a preconfigured threshold, the segmenting is repeated with smaller sized segments, wherein if the SNR and group delay variation between any two segments is less than another preconfigured threshold, the segment is repeated with larger sized segments.

19. The apparatus of claim 15, wherein the pilot pattern is determined from a LUT associating the group delay with the pilot pattern.

20. The apparatus of claim 15, wherein the group delay is estimated through phase ramp in frequency domain.

* * * * *